US010846222B1

(12) United States Patent
Kolli et al.

(10) Patent No.: US 10,846,222 B1
(45) Date of Patent: Nov. 24, 2020

(54) DIRTY DATA TRACKING IN PERSISTENT MEMORY SYSTEMS

(71) Applicant: VMware, Inc., Palo Alto, CA (US)

(72) Inventors: Aasheesh Kolli, Santa Clara, CA (US); Vijaychidambaram Velayudhan Pillai, Austin, TX (US)

(73) Assignee: VMware, Inc., Palo Alto, CA (US)

( * ) Notice: Subject to any disclaimer, the term of this patent is extended or adjusted under 35 U.S.C. 154(b) by 0 days.

(21) Appl. No.: 16/459,055

(22) Filed: Jul. 1, 2019

(51) Int. Cl.
*G06F 12/08* (2016.01)
*G06F 8/41* (2018.01)
*G06F 9/30* (2018.01)
*G06F 12/0804* (2016.01)
*G06F 12/06* (2006.01)
*G06F 9/38* (2018.01)

(52) U.S. Cl.
CPC ............ *G06F 12/0804* (2013.01); *G06F 8/41* (2013.01); *G06F 9/30043* (2013.01); *G06F 9/3836* (2013.01); *G06F 12/0646* (2013.01); *G06F 2212/1032* (2013.01)

(58) Field of Classification Search
None
See application file for complete search history.

(56) References Cited

U.S. PATENT DOCUMENTS

| | | | | |
|---|---|---|---|---|
| 2014/0281272 A1* | 9/2014 | Loaiza | ................ | G06F 11/2058 711/144 |
| 2015/0127909 A1 | 5/2015 | Ghai et al. | | |
| 2018/0107596 A1* | 4/2018 | Kelly | ................ | G06F 11/0751 |
| 2018/0143850 A1 | 5/2018 | Avni et al. | | |
| 2018/0260559 A1* | 9/2018 | Jarrous | ............... | G06F 9/44521 |
| 2018/0276120 A1* | 9/2018 | Vytiniotis | ........... | G06F 12/0261 |
| 2018/0329651 A1 | 11/2018 | Chang et al. | | |
| 2019/0243747 A1* | 8/2019 | Ross | ........................ | G06F 17/11 |
| 2020/0034297 A1* | 1/2020 | Calciu | ................ | G06F 12/0837 |

OTHER PUBLICATIONS

Giles, Ellis et al., Bridging the Programming Gap Between Persistent and Volatile Memory Using WrAP, in ACM computing Frontiers, May 2013.
Joshi, Arpit et al., Atom: Atomic Durability in Non-volatile Memory through Hardware Logging, 23rd IEEE ntemational Symposium on High-Performance Computer Architecture, 2017.
Liu, Mengxing et al., DudeTM: Building Durable Transactions with Decoupling for Persistent Memory, 22nd Acm International Conference on Architectural Support for Programming Languages and Operations Systems (ASPLOS), Apr. 2017.
Volos, Hans et al., Mnemosyne: Lightweight Persistent Memory, ACM SIGARCH Computer Architecture News, Mar. 2011.

* cited by examiner

*Primary Examiner* — Philip Wang
(74) *Attorney, Agent, or Firm* — Patterson + Sheridan, LLP

(57) ABSTRACT

An example method of configuring an application to manage persistent memory (PM) in a computer system includes: modifying, by a compiler during compilation of the application, source code of the application to add instructions to update tracking metadata for store instructions in the source code that target memory blocks mapped to the PM; compiling, by the compiler, the source code to generate an executable process; and issuing, by a synchronization routine executing on the computer, write-back instructions during execution of the executable process based on the tracking metadata.

17 Claims, 8 Drawing Sheets

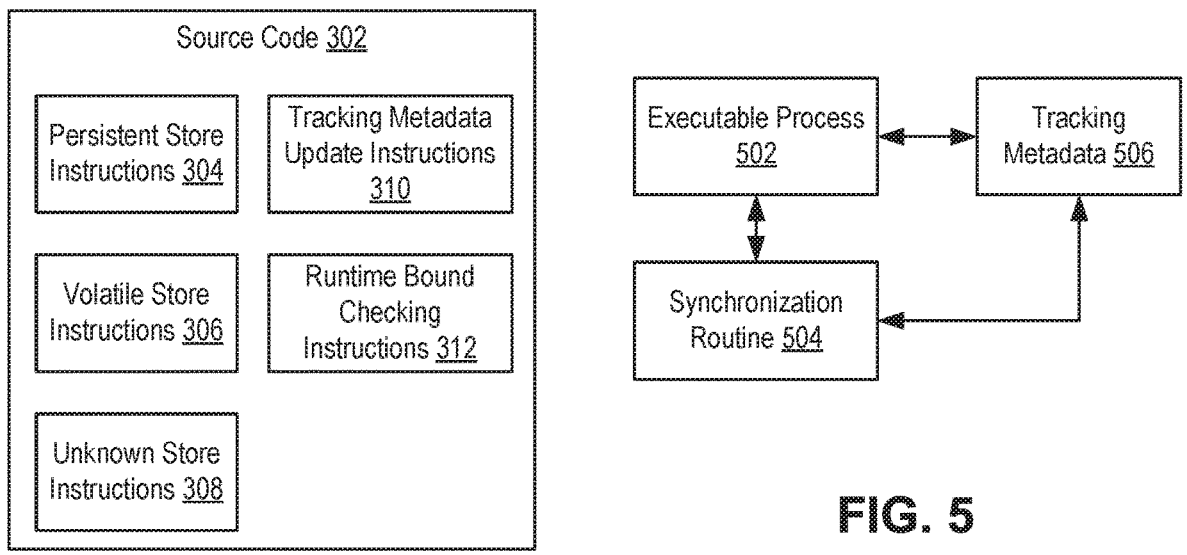
FIG. 3
FIG. 5
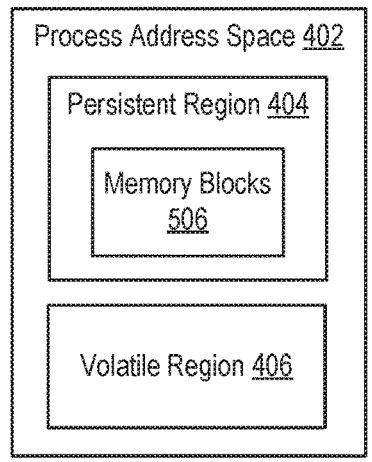
FIG. 4

DIRTY DATA TRACKING IN PERSISTENT MEMORY SYSTEMS

CROSS-REFERENCE TO RELATED APPLICATIONS

This application is related to pending U.S. application Ser. No. 16/459,065, filed on even date herewith (entitled "Dirty Data Tracking in Persistent Memory Systems"), which is incorporated by reference herein.

BACKGROUND

Emerging persistent memory (PM) technologies provide disk-like durability and at the same time can be accessed with latency close to dynamic random access memory (DRAM). These new memory technologies blur the difference between storage and memory and can be used to store and manipulate persistent data in memory using processor load and store instructions, rather than having to navigate through various layers of system software. Moreover, PMs are byte-addressable, meaning that programmers no longer have to serialize and de-serialize their data for different memory and storage access granularities. Such systems with PMs have the potential to revolutionize how persistent data is managed and have sparked an assortment of research in different areas of computer science, such as databases and transaction logging, persistent data structures, file systems, computer architecture, and many more.

PM systems should allow applications to correctly recover data in PM in the presence of failures (e.g., unexpected power outages, kernel/application crashes, etc.). That is, applications using PMs should ensure crash consistency. To ensure crash consistency, programmers need to order updates all the way to the PM. For example, consider the case of developing a journaling file system for PM systems. The crash consistency of the file system relies on ensuring that the journal updates reach the PM before metadata and data updates for a given file system operation. However, the programmer's ability to order updates is limited by: (1) the presence of programmer-transparent volatile hardware structures, such as processor caches and any other structures that lose contents on a failure; and (2) hardware optimizations, such as writeback caching and memory controller reordering that coalesce and reorder updates to the PM. Thus, there is a need for techniques to ensure crash consistency in computer systems employing PMs.

SUMMARY

In an embodiment, a method of configuring an application to manage persistent memory (PM) in a computer system includes: modifying, by a compiler during compilation of the application, source code of the application to add instructions to update tracking metadata for store instructions in the source code that target memory blocks mapped to the PM; compiling, by the compiler, the source code to generate an executable process; and issuing, by a synchronization routine executing on the computer, write-back instructions during execution of the executable process based on the tracking metadata.

Further embodiments include a non-transitory computer-readable storage medium comprising instructions that cause a computer system to carry out the above method, as well as a computer system configured to carry out the above method.

BRIEF DESCRIPTION OF THE DRAWINGS

FIG. 3 is a block diagram depicting source code according to an embodiment.

FIG. 4 is a block diagram depicting a process address space according to an embodiment.

FIG. 5 is a block diagram depicting process execution according to an embodiment.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Figure 1:
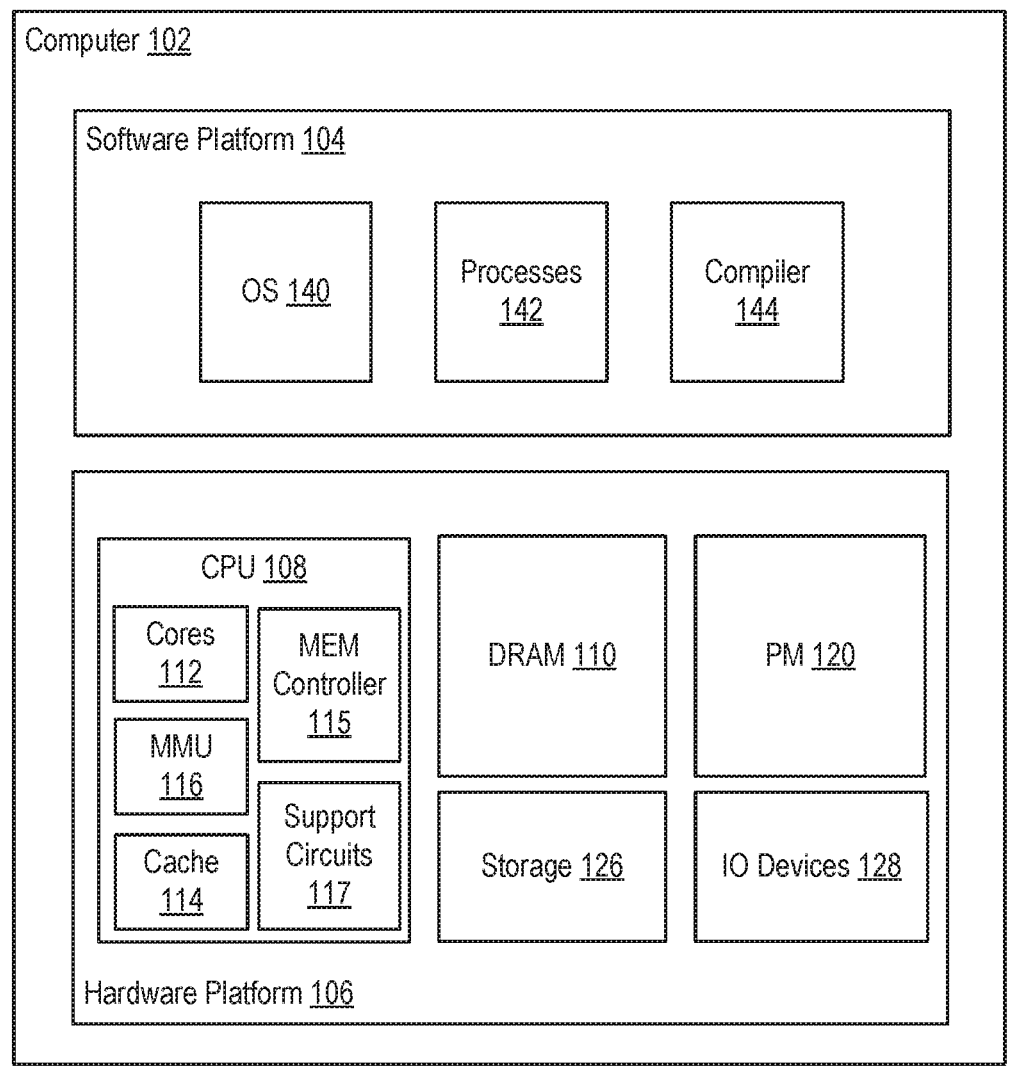
FIG. 1 is a block diagram depicting a computing system according to an embodiment.

FIG. 1 is a block diagram depicting a computing system 100 according to an embodiment. Computing system 100 includes a computer 102 having a software platform 104 executing on a hardware platform 106. Hardware platform 106 may include conventional components of a computing device, such as a central processing unit (CPU) 108 and dynamic random access memory (DRAM) 110, as well as a storage system (storage 126), input/output devices 128, and the like. Hardware platform 106 also includes persistent memory ("PM 120").

CPU 108 is configured to execute instructions, for example, executable instructions that perform one or more operations described herein and may be stored in DRAM 110, PM 120, and storage 126. DRAM 110 is coupled to a memory bus of CPU 108. DRAM 110 is a device allowing information, such as executable instructions, configurations, and other data, to be stored and retrieved. DRAM 110 may include, for example, one or more random access memory (RAM) modules. Example PM technologies include Intel® 3D XPoint™, spin-transfer torque RAM (STT-RAM), resistive RAM (ReRAM), and the like. PM 120 is configured to store data persistently (e.g., non-volatile memory). Similar to DRAM 110, PM 120 is coupled to the memory bus of CPU 108. Storage 126 and IO devices 128 are coupled to a peripheral bus of CPU 108. Storage 126 includes local storage devices (e.g., one or more hard disks, flash memory modules, solid state disks, and optical disks) and/or a storage interface that enables host computer 102 to communicate with one or more network data storage systems. Examples of a storage interface are a host bus adapter (HBA) that couples host computer 102 to one or more storage arrays, such as a storage area network (SAN) or a network-attached storage (NAS), as well as other network data storage systems. IO devices 128 include various network interfaces and the like.

CPU 108 includes one or more cores 112, a memory management unit (MMU) 116, cache memory ("cache 114"), memory controller ("MEM controller 115"), and support circuits 117. Each core 112 is a microprocessor or like type processor element, such as an x86-based processor, ARM®-based processor, or the like. Cache memory 114 includes a hierarchy of memory structures for caching instructions and data for CPU 108 (e.g., L1, L2, and L3 cache, translation lookaside buffer (TLB), and the like). MEM controller 115 is configured to control memory devices attached to a memory bus of the CPU 108, e.g., DRAM 110 and PM 120. Support circuits 117 include various devices supporting CPU 108, such as a peripheral bus that implements an expansion bus standard, such as Peripheral Component Interconnect Express (PCIe).

MMU 116 implements memory management in the form of paging of system memory (e.g., DRAM 110 and PM 120). MMU 116 controls address translation and access permissions for memory accesses made by cores 112. MMU 116 implements a plurality of address translation schemes based on privilege level (also referred to as "translation schemes"). Each translation scheme generally takes an input address (IA) and, if permitted based on the defined access permissions, returns an output address (OA). If an address translation cannot be performed (e.g., due to violation of the access permissions), MMU 116 generates an exception.

A "page" is the smallest unit of memory for which an IA-to-OA mapping can be specified. Each page (also referred to herein as a "memory page") includes a plurality of separately addressable data words, each of which in turn includes one or more bytes. Each address includes an upper portion that specifies a page and a lower portion that specifies an offset into the page. Each address translation involves translating the upper portion of the IA into an OA. CPU 108 can support one or more page sizes. For example, some processors support 4 kilobyte (KB), 2 megabyte (MB), and 1 gigabyte (GB) page sizes. Other processors may support other page sizes. In addition, the width of the IA can be configurable for each address translation scheme.

Software platform 104 includes an operating system (OS) 140, processes 142, and a compiler 144. OS 140 executes directly on hardware platform 102. OS 140 can be any commodity operating system known in the art, such as such as Linux®, Microsoft Windows®, Mac OS®, or the like. OS 140 manages execution of processes 142 that form applications of the software platform 104. Compiler 144 transforms source code representations of processes into executable form.

Given the low latency of PM 120, one method to access such memory is to memory map a region of PM 120 into the address space of a process 142 and then directly access the region using load and store instructions in the instruction set architecture (ISA) of CPU 108. For example, in a Linux® OS, a process 142 can use mmap( ), a POSIX-compliant system call, to map a region of PM 120 into its address space. Other operating systems have similar system functions. Thus, each address in the memory-mapped region will correspond to an address on PM 120. However, since PM 120 is directly accessed, software systems in OS 140, such as the file system, cannot keep track of the dirty data that needs to be flushed to PM 120 on a subsequent synchronization event (e.g., a call to msync( ) or other system call for flushing changes to a memory-mapped region). OS 140 maintains page tables that keep track of which pages are dirty in the address space. However, the granularity of such tracking is a whole page. Thus, even if one byte is modified, the whole page has to be written back to PM 120. The minimum unit that can be written back to memory from CPU 108 is the size of one cache line (e.g., 64 bytes or any other size supported by CPU 108). Considering a 64 byte cache line, the overhead of writing back an entire page can be as much as 64 times for a page size of 4 KB. Due to the high density of PMs, it is quite likely that a large amount of persistent memory would require using large or huge pages. The overhead of flushing a 2 MB page when only a single cache line is needed is 32,768 times. Put simply, the cost of writing back dirty data can be high enough to render PM systems impractical. Accordingly, techniques are described herein to provide dirty data tracking for efficient write back of dirty data to PM 120.

Some x86 processors available from Intel® include instructions in the ISA to enable programming for PM systems. The relevant instructions are: (1) clflush, which writes back and invalidates a cache line to the memory controller; (2) clflushopt, an optimized clflush that enforces fewer ordering constraints with respect to adjacent instructions; and (3) clwb, which writes back a cache line to the memory controller. Further, systems can support Asynchronous DRAM Refresh (ADR) to complement these ISA instructions. ADR guarantees that all accepted write-back request at the memory controller will be drained to the PM in the event of a system failure, essentially making the memory controller persistent. On PM systems with ADR support, any of the three instructions (clflush, clflushopt, and clwb) may be used to write back the latest value of a cache line to the memory controller and hence to persistence. For the purposes of crash consistency, these three instructions are equivalent (they exhibit different performance characteristics) and are collectively referred to herein as "write-back instructions." The ISA can also provide an sfence instruction to order write-back: the completion of the sfence instruction indicates all previous write-back instructions have completed. Processes use a combination of write-back and sfence instructions to ensure crash consistency.

Write-back instructions are expensive since CPU 108 has to first search for the cache line in modified state throughout the cache hierarchy and then, if a modified copy is found, write back the cache line through successive levels of the cache hierarchy all the way to MEM controller 115. A single write-back instruction can take 20-30 nanoseconds (ns) to complete (e.g., a significant portion of DRAM access latency). The intermittent presence of sfence instructions limits the ability of modern out-of-order processors to hide these latencies with speculative execution. The sfence instruction requires the "global completion" of all memory operations executed prior to the sfence before any of the instructions after sfence may be executed. This reduces opportunities for speculative execution, exposing latencies of write-back instructions on the critical path of program execution. As a result, programmers use write-back instructions with some caution.

Lack of perfect knowledge or programmer conservatism causes an overestimation of the amount of dirty data and an unnecessary amplification of the number of write-back instructions issued (referred to herein as "write-back amplification"). Consider the memory-mapped scheme discussed above for accessing PM 120, where programmers rely on the virtual memory subsystem to track dirty data. As noted, the virtual memory subsystem operates at page granularities, meaning that even if one cache line in a page is dirty, the entire page is marked dirty. To ensure persistence during msync( ), all the cache lines within the page are written back even though only one cache line is dirty. This problem will be even more acute in systems with large page sizes.

The programmer can take on the burden of tracking dirty data and issue only the necessary write-back instructions. However, there are several downsides to this approach: (1) this is an unreasonable burden on the programmer; (2) programmers might be conservative and overestimate the amount of dirty data; (3) programmers might sacrifice crash consistency for better performance; and (4) programmers might not always have perfect information of what data is dirty (e.g., due to the use of third party libraries). Accordingly, techniques are described herein that provide automatic mechanisms to relieve programmers of the burden of dirty data tracking. These automatic mechanisms have multiple benefits: (1) they improve application performance by reducing write-back amplification; (2) they relieve the programmers of dirty data tracking, making PM system programmability simpler; and (3) they completely eliminate a class of crash consistency bugs that would have arisen from incorrect ad-hoc dirty data tracking mechanisms implemented by programmers.

Compiler-Assisted Dirty Data Tracking

In embodiments, processes 142 directly manipulate PM 120 using load and store instructions of CPU 108. Thus, user-space libraries cannot be used to intercept updates to PM 120 and perform the necessary dirty data tracking and write-back instructions. Compiler-assisted dirty data tracking alleviates programmers of the burden for tracking and writing back modified cache lines. The goals for compiler-assisted dirty data tracking are to accurately track dirty data while incurring minimal performance overheads maintaining tracking metadata. One compiler-centric approach is to have compiler 144 maintain a log of cache lines that all the store instructions modify in an application. At a subsequent msync( ), the compiler-maintained log can be used to generate the appropriate write-back instructions. While this approach is simple, it greatly overestimates the number of cache lines that have to be written back for crash consistency. Most cache lines modified within an application are volatile data structures that are irrelevant for recoverability and need not be written back. Embodiments described herein provide a dirty data tracking approach that can identify store instructions modifying cache lines relevant for crash consistency and update the tracking metadata for all such store instructions. This approach introduces two sources of overhead: (1) the overhead from identifying if a particular store modifies a cache line relevant for crash consistency; and (2) the overhead from updating the tracking metadata for all such stores. Embodiments described below reduce these sources of overheads in compiler-assisted dirty data tracking.

Figure 2:
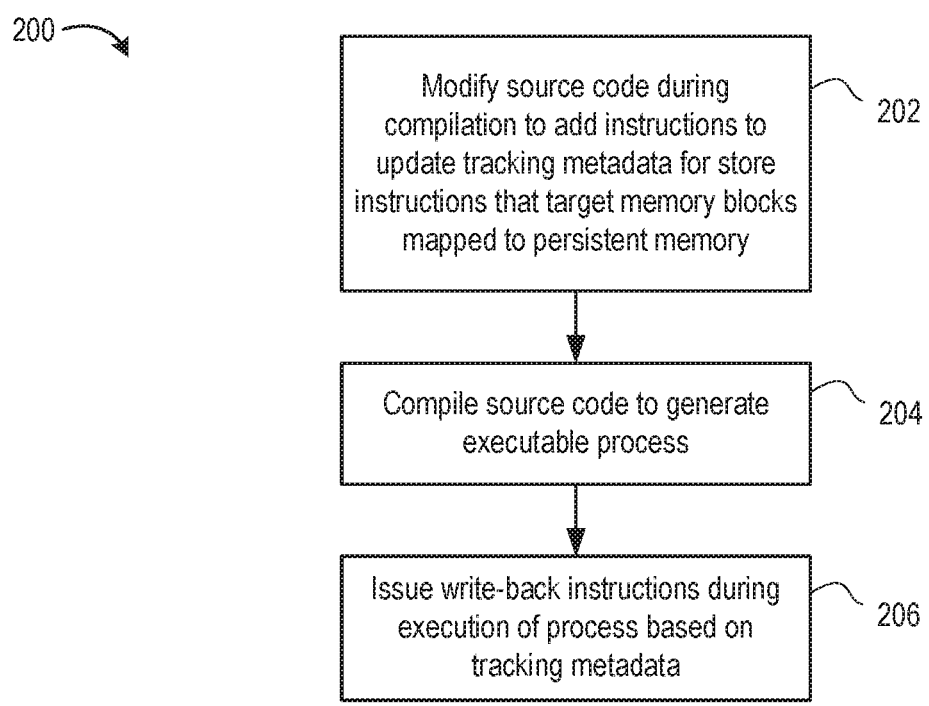
FIG. 2 is a flow diagram depicting a method of maintaining crash consistency for a process that writes to persistent memory (PM) according to an embodiment.

FIG. 2 is a flow diagram depicting a method 200 of maintaining crash consistency for a process that writes to PM 120 according to an embodiment. Method 200 begins at step 202, where compiler 144 modifies source code during compilation to add instructions to update tracking metadata for store instructions that target memory blocks mapped to persistent memory. The source code uses memory map routines such as mmap( ) or similar to map regions of PM 120 into the address space and uses direct loads and stores to the memory-mapped region. Compiler 144 is configured to track the persistent memory writes of the application. Since tracking all writes may be expensive, the tracked memory region may be limited to a portion of the address space, as discussed in embodiments below. Compiler 144 replaces one or more writes to the memory-mapped region with two operations: the original write and a second write to track the application write in the tracking metadata.

At step 204, compiler 144 compiles the source code to generate an executable process. At step 306, OS 140 issues write-back instructions during execution of the process based on the tracking metadata. For example, upon execution of the synchronization routine such as msync( ) or equivalent, flushes are issued only for the modified cache lines as identified by the tracking metadata. In an embodiment, the synchronization routine is modified to account for the tracking metadata. In another embodiment, calls to the standard synchronization routine are intercepted by a custom synchronization routine that accounts for the tracking metadata. In either case, write-back instructions are issued for only those cache lines that are identified as dirty and as being part of the memory-mapped region.

FIG. 3 is a block diagram depicting source code 302 according to an embodiment. Source code 302 includes persistent store instructions 304, volatile store instructions 306, and unknown store instructions 308. Persistent store instructions 304 are store instructions that target the region of PM 120 that has been mapped into the process address space. Volatile store instructions 306 are store instructions that target a non-persistent portion of the process address space (e.g., the stack, the heap, etc.). Unknown store instructions 308 are store instructions that compiler 144 cannot determine are either persistent or volatile during compile-time. Compiler 144 adds tracking metadata update instructions 310 to track writes to the memory-mapped persistent portion of the process address space. Compiler 144 adds runtime bound checking instructions 312 for each of the unknown store instructions 308. Runtime bound checking instructions determine if store instructions executed at runtime are targeting the persistent portion of the address space or the volatile portion of the address space.

FIG. 4 is a block diagram depicting a process address space 402 according to an embodiment. Process address space 402 includes a persistent region 404 and a volatile region 406. Persistent region 404 is a region of process address space 402 into which a region of PM 120 has been mapped. Volatile region 406 is a region of process address space 402 that stores non-persistent data, such as the process stack, process heap, and the like. Persistent region 404 includes memory blocks 506. Each memory block 506 is the smallest unit of memory processed in cache 114 of CPU 108 (e.g., a cache line).

FIG. 5 is a block diagram depicting process execution according to an embodiment. An executable process 502 maintains and updates tracking metadata 506 during runtime based on the tracking metadata update instructions 310 and runtime bound checking instructions 312 added by compiler 144 during compile-time. Executable process 502 calls synchronization routine 504 to flush dirty cache lines to PM 120. Synchronization routine 504 issues write-back instructions for those cache lines identified in tracking metadata 506.

Figure 6:
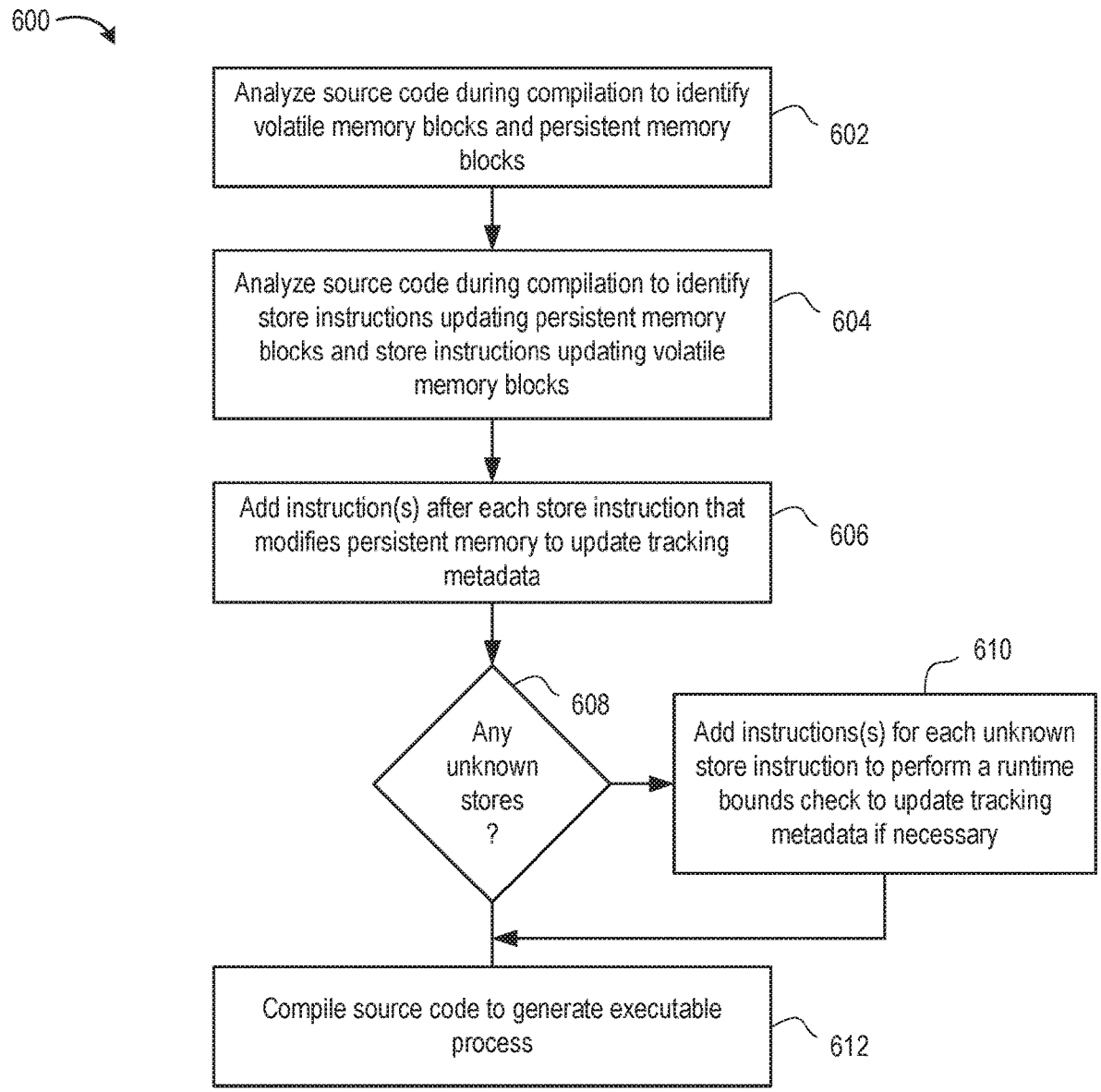
FIG. 6 is a block diagram depicting a method of tracking dirty data during compile-time according to an embodiment.

FIG. 6 is a block diagram depicting a method 600 of tracking dirty data during compile-time according to an embodiment. Method 600 begins at step 602, where compiler 144 analyzes the source code during compilation to identify volatile memory blocks and persistent memory blocks. Compiler 144 identifies which cache lines are relevant for crash consistency using the following assumptions: (1) there is a persistent region of the process address space into which any memory-mapped region of PM 120 is mapped; and (2) any cache line that belongs to the persistent region is relevant for the crash consistency of the application. Cache lines belonging to the persistent region are "persistent cache lines" and other cache lines are "volatile cache lines." More generally, memory blocks belonging to the persistent region are "persistent memory blocks" and other memory blocks are "volatile memory blocks."

Runtime bounds checking can be used to determine if a particular store instruction is modifying persistent cache lines. However, performing a runtime bounds check on every store instruction will likely incur prohibitive performance overheads. Thus, at step 604, compiler 144 analyzes the source code during compilation to identify store instructions that update persistent memory blocks ("persistent store instructions") and store instructions that update volatile memory blocks ("volatile store instructions"). For persistent store instructions and volatile store instructions, runtime bounds checking is unnecessary and not employed.

To identify if a store instruction modifies a persistent memory block, compiler 144 identifies the memory map instruction to obtain pointers to the region and the size thereof. Compiler 144 uses dependency analysis and static bounds checking to determine if subsequent store instructions update persistent memory blocks. To identify store instructions that update volatile memory blocks, compiler 144 uses a multi-step approach: (1) all stack variables do not lie in the persistent region, so any store instruction modifying a stack variable modifies a volatile memory block; and (2) compiler 144 tracks dynamic allocation routines (e.g., malloc( ) and new( )) to identify the application's heap. Since the heap is not part of the persistent region, any store instruction modifying the heap (identified through dependency analysis and static bounds checking) is designated as modifying a volatile memory block. For store instructions identified as modifying a persistent or volatile memory block, no runtime bounds check is required.

At step 606, compiler 144 adds instruction(s) after each store instruction that modifies persistent memory to update the tracking metadata. At step 608, compiler 144 determines if there are any unknown store instructions. If so, method 600 proceeds to step 610, where compiler 144 adds instruction(s) for each unknown store instruction to perform a runtime bounds check to update tracking metadata if necessary. Method 600 then proceeds to step 612. If there are no unknown store instructions, method 600 proceeds directly to step 612. At step 612, compiler 144 compiles the source code to generate an executable process.

For store instructions that modify persistent cache lines, the tracking metadata is updated to maintain the identity of the modified cache line. This tracking metadata is then queries at the next synchronization routine to determine the exact set of write-back instructions to be issued. Dirty data tracking can be minimized to reduce the following sources of overhead that arise from metadata maintenance: (1) Dirty data representation—inaccurate dirty data representation results in spurious write-back instructions being issued. Metadata representation should minimize spurious write-back instructions. (2) Space overheads—metadata should require as little space as possible. (3) Update overhead—the metadata is updated on every store modifying a persistent cache line. Metadata should support fast updates. (4) Cache line enumeration—the metadata will be queried for a set of cache lines to be written back. Metadata should support fast enumeration of modified persistent cache lines. (5) Reset overhead—once cache lines have been written-back, the metadata will be reset in order to be used to track dirty data for the next epoch. Metadata should support fast reset operations.

In one embodiment, tracking metadata 506 comprises a bit array. A bit array is used over a range of cache line addresses (e.g., in the worst case over the entire persistent region). Each bit in the bit vector represents whether the corresponding cache line has been modified since the last synchronization. Bit arrays support fast metadata updates, as only one bit flip is necessary. While the space overhead is ideal on a per cache line basis (only one bit), it is also proportional to the size of the persistent region. Similarly, the latency of the metadata reset operation is proportional to the size of the persistent address space (time it takes to zero out all the bits in the array). Thus, for applications that use only a small fraction of the persistent region, the space overheads are high and metadata resets are slow. In case of the bit array, compiler 144 adds instruction(s) to set the appropriate bit in the bit array after a store instruction to a persistent cache line (step 606).

In another embodiment, tracking metadata 506 comprises a circular buffer. The circular buffer stores cache line address for modified cache lines. Metadata updates involve adding a new entry into the buffer. If the buffer is full, space is made by writing back the oldest cache line in the buffer. For metadata resets, all the buffer entries have to be marked invalid, an operation whose latency will be proportional to the size of the buffer. The space overheads are also proportional to the size of the buffer. However, the same cache line address can be added to the buffer multiple times resulting in multiple write-back instructions being issued for the same cache line. In an embodiment, synchronization routine 504 uses a bloom filter during the enumeration phase to weed out these spurious write-back instructions. Further, if the buffer gets full, then the oldest entry is cleared for the next store instruction by issuing a write-back for the oldest address. This operation has the effect of spreading out write-back instructions throughout the epoch and allows for hiding the write-back latencies with program execution rather than incurring them at the end of the epoch. In case of the circular buffer, compiler 144 adds instructions to check if the circular buffer is full and add a cache line address to the buffer after a store instruction to a persistent cache line (step 606). If the circular buffer is full, compiler 144 adds a write-back instruction to write back the oldest entry in the circular buffer.

Figure 7:
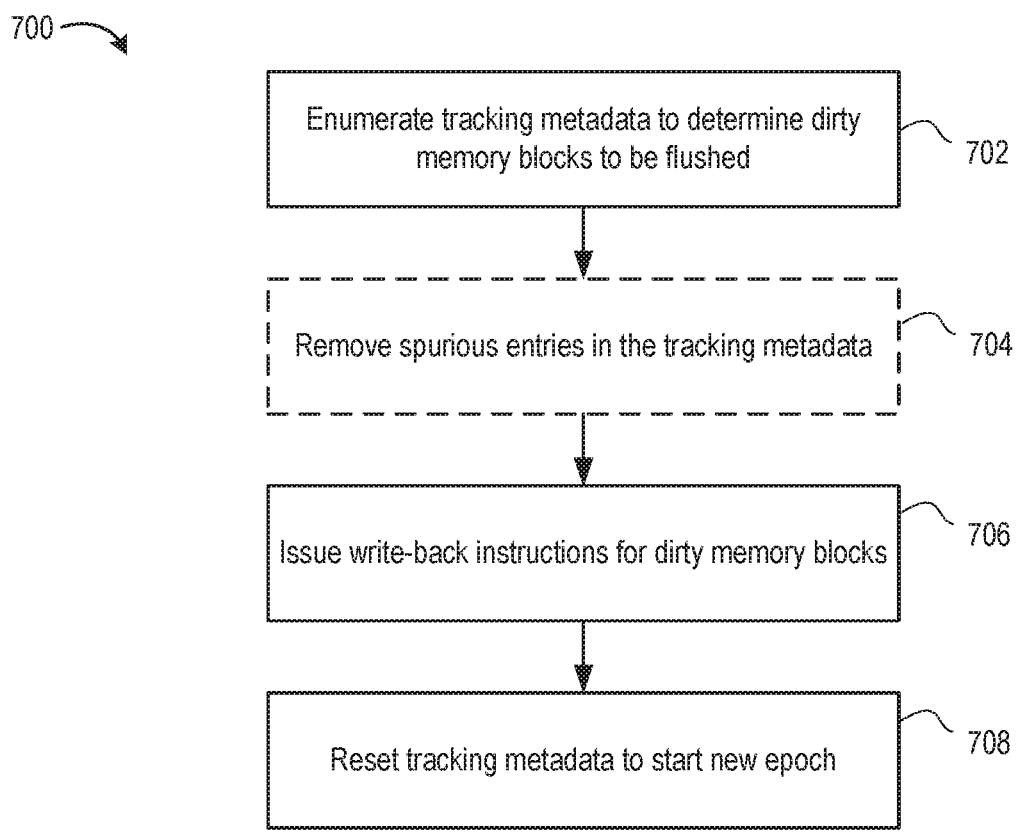
FIG. 7 is a flow diagram depicting a method of flushing dirty cache lines based on tracking metadata according to an embodiment.

FIG. 7 is a flow diagram depicting a method 700 of flushing dirty cache lines based on tracking metadata according to an embodiment. Method 700 begins at step 702, where synchronization routine 504 enumerates tracking metadata 506 to determine dirty memory blocks to be flushed. At step 704, synchronization routine 504 removes any spurious entries in tracking metadata 506. Step 704 is optional depending on the implementation of tracking metadata 506. For a bit array, step 704 is omitted. For a circular buffer, step 704 is performed in case of multiple entries for the same dirty memory block. At step 706, synchronization routine 504 issues write-back instructions for dirty memory blocks. At step 708, synchronization routine 504 resets tracking metadata 506 to start a new epoch.

Hardware-Assisted Dirty Data Tracking

While the compiler-assisted dirty data tracking mechanism improves the performance of persistent memory applications by reducing write-back amplification, the performance may not be ideal in all cases due to the following factors: (1) Overheads of dirty data tracking—All software approaches execute additional instructions to implement the respective dirty data tracking mechanisms. (2) Write Set v. Active Dirty Set—All software approaches can accurately track the exact write set (WS) of an application, i.e., the set of all cache lines dirtied by the application. However, a subset of the WS could already have been written back from cache 114 during regular cache operations of CPU 108. Ideally, the application should be able to identify and issue write-back instructions for only the subset of the WS that has a dirty cache line copy in the cache 114 (referred to as the Active Data Set (ADS)) and not the entire WS. In an embodiment, hardware mechanisms are provided to track dirty-data and track the ADS for solving both of these sources of performance degradation.

Figure 8:
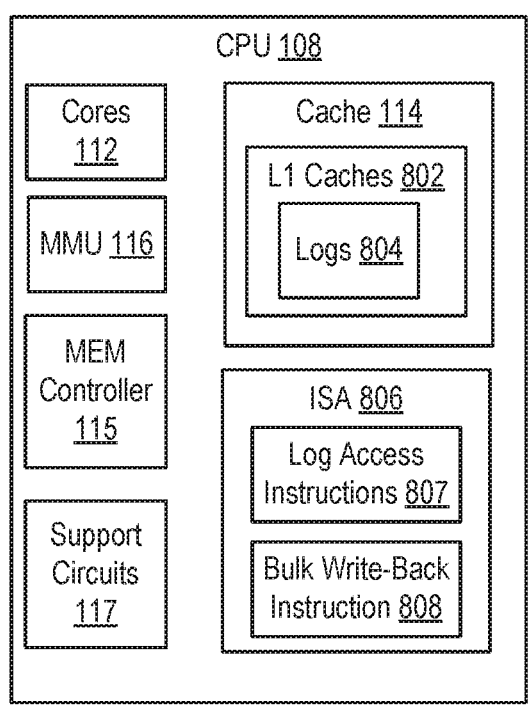
FIG. 8 is a block diagram depicting CPU having hardware extensions for tracking dirty data and performing efficient write-back operations according to an example.

FIG. 8 is a block diagram depicting CPU 108 having hardware extensions for tracking dirty data and performing efficient write-back operations according to an example. CPU 108 includes cores 112, MMU 116, MEM controller 115, support circuits 117, and cache 114 as described above. Cache 114 includes L1 caches 802, one for each of cores 112. Each L1 cache 802 includes a log 804. Thus, a per-core hardware log is provided at the L1 data cache level to precisely track the WS of an application. In an embodiment, log 804 is a circular buffer that records all addresses of the store instructions that are being executed by an application. On ever store instruction encountered at the L1 data cache level, along with servicing the store request, CPU 108 inserts the corresponding cache line address into a log 804. When the application decides to perform a write-back operation, the application uses log access instructions 807 provided in an ISA 806 of CPU 108. Log access instructions 807 provide instructions an application can use to query logs 804 to identify its WS. Once the requisite write-back instructions are executed, the application issues an instruction to clear the relevant logs 804.

Figure 9:
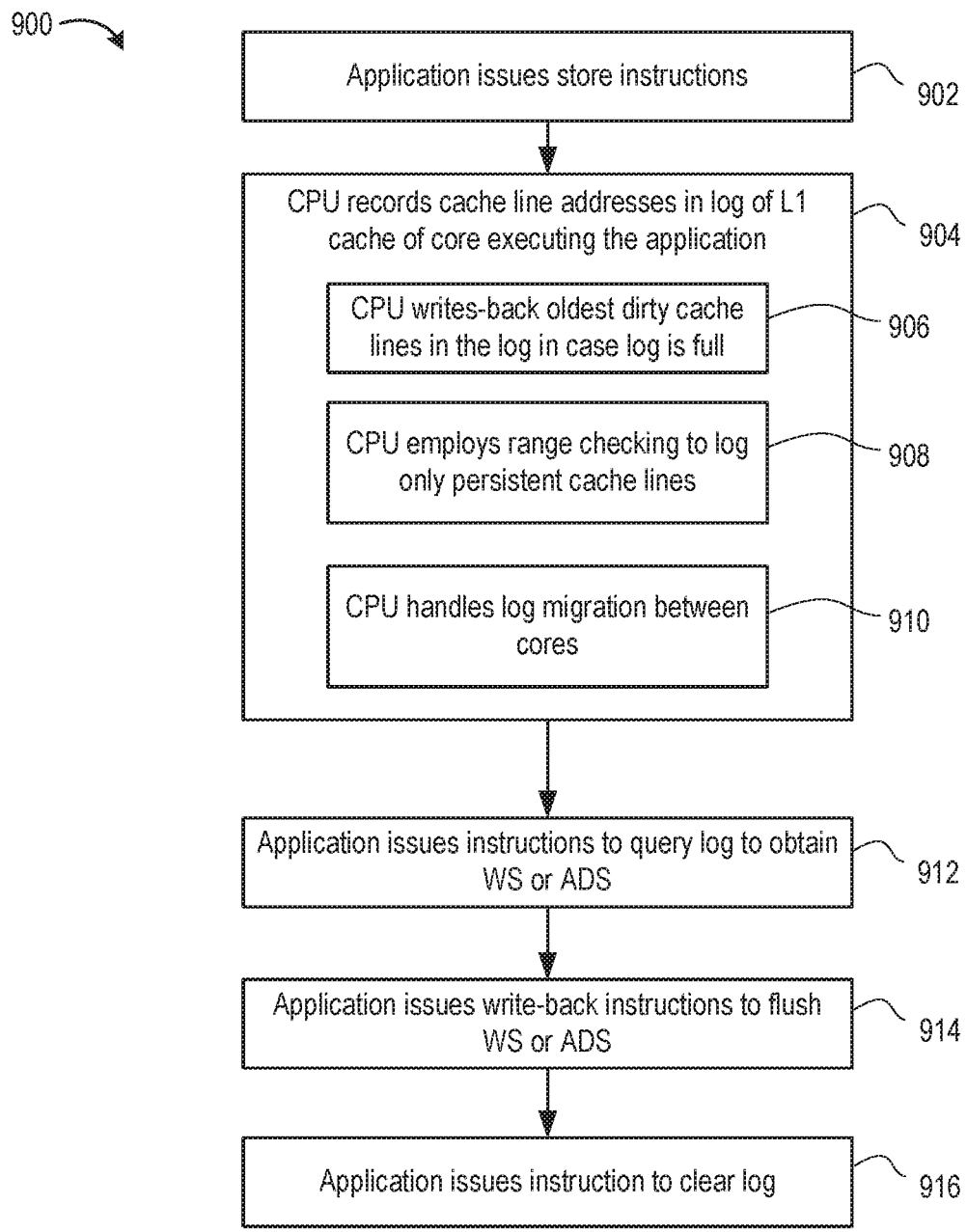
FIG. 9 is a flow diagram depicting a method of hardware tracking of dirty data according to an embodiment.

FIG. 9 is a flow diagram depicting a method 900 of hardware tracking of dirty data according to an embodiment. Method 900 begins at step 902, where an application issues store instructions. At step 904, CPU 108 records cache line addresses in a log 804 of L1 cache 802 of a core 112 executing the application.

CPU can perform one or more additional operations. In an embodiment, CPU 108 writes back the oldest dirty cache lines in the log in case the log becomes full (step 906). It is possible for some applications that the log space is not sufficient. For such applications, the older logged addresses have to be removed to make space of newer addresses. However, the older address cannot be simply discarded as the application would lose information about its WS. Thus, before an address is discarded from the log, CPU 108 writes back the corresponding cache line to PM 120. With this approach, even if the address is removed from the log (and hence the WS), the application's crash consistency is not affected as the corresponding cache line's latest value is already persistent.

In an embodiment, CPU 108 employs range checking to log only persistent cache lines that are dirtied (step 908). In such case, application can execute one or more log access instructions 807 to provide CPU 108 with the address range of a persistent region in the process address space. In this embodiment, each log 804 tracks the ADS rather than the entire WS.

In an embodiment, CPU 108 handles log migration between cores (step 910). Per-core hardware logs are maintained in CPU 108. However, individual threads and processes migrate between different cores in a multi-core system. To ensure that information regarding a thread's (or process') WS is not lost during migration, CPU 108 considers log 804 as part of the thread's (or process') architectural state and migrated along with the tread (or process). An alternative approach is to empty the per-core log by writing back all the logged cache lines before a migration.

At step 912, the application issues instructions to query log 804 to obtain the WS or ADS. At step 914, the application issues write-back instructions to flush the WS or ADS to persistence. At step 916, the application issues an instruction to clear log 804.

Returning to FIG. 8, tracking the WS to tackle write-back amplification suffers from two fundamental drawbacks: (1) per cache line write-back instructions—these mechanism reduce the overheads of dirty-data tracking the WS, however, they introduce overheads of querying and identifying the WS and then require the application to issue write-back instructions for each cache line in the WS separately. In an embodiment, ISA 806 includes a bulk write-back instruction 808 for use by applications. Bulk write-back instruction 808 targets the entire WS tracked in log 804 and allows the application to issue a single instruction to flush the dirty data to persistence.

Modern x86 systems include the wbinvd instruction that writes back and invalidates all cache lines in the hierarchy. This instruction, as currently implemented, is ill suited as a bulk write-back instruction. There are several inefficiencies of wbinvd that make it ill suited for use as a bulk write-back instruction. The wbinvd instruction will both write back and invalidate all the cache lines in the hierarchy. Bulk write-back instruction 808 just writes back the identified dirty cache lines in log 804 and does not invalidate them. The wbinvd instruction writes back all the dirty cache lines in the cache hierarchy irrespective of which application has modified them. The two downsides to this implementation are: (1) the latency of wbinvd instruction depends on the number of dirty cache lines in the hierarchy and not the number of cache lines that have been dirtied by the issuing application; and (2) writing back cache lines belong to other applications will have an adverse effect on the performance of those applications as their cache lines unexpectedly lose write permissions. Bulk write-back instruction 808 only writes back dirty cache lines that belong to the issuing application by making use of application specific identifiers (IDs) of the cache lines that are present in cache 114 to allow for cache monitoring.

Even within the cache lines modified by a single application, not all of them need to be written back to persistent memory. Only the dirty persistent cache lines have to be written back. Bulk write-back instruction 808 includes provisions for narrowing down the search for the ADS in cases where log 804 stores the WS. In an embodiment, bulk write-back instruction 808 takes as input an upper-bound and a lower-bound for the range of interest and only writes back cache lines that belong in the range. In another embodiment, as discussed above, log 804 stores only the ADS as CPU 108 employs range checking when entering cache line addresses in log 804.

Figure 10:
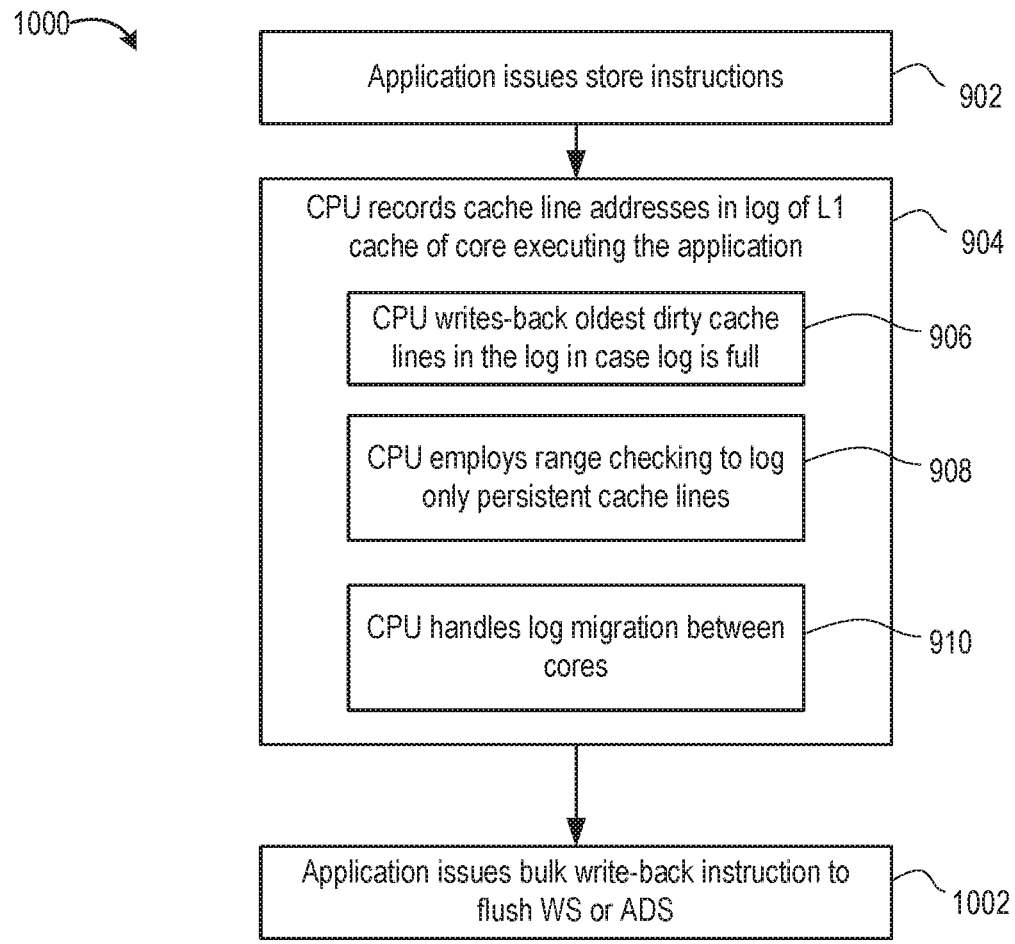
FIG. 10 is a flow diagram depicting a method of hardware tracking of dirty data according to another embodiment.

FIG. 10 is a flow diagram depicting a method 1000 of hardware tracking of dirty data according to an embodiment. Method 1000 includes steps 902 through 910 of method 900 described above. However, after step 904, method 1000 proceeds to step 1002, where the application issues bulk write-back instruction 808 to flush the WS or ADS. In some embodiments, in cases where log 804 stores the WS, application can provide an address range as input to bulk write-back instruction 808 to define the ADS. Otherwise, bulk write-back instruction writes back the entire log (which may include the WS or the ADS, as noted above).

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Certain embodiments as described above involve a hardware abstraction layer on top of a host computer. The hardware abstraction layer allows multiple contexts to share the hardware resource. In one embodiment, these contexts are isolated from each other, each having at least a user application running therein. The hardware abstraction layer thus provides benefits of resource isolation and allocation among the contexts. In the foregoing embodiments, virtual machines are used as an example for the contexts and hypervisors as an example for the hardware abstraction layer. As described above, each virtual machine includes a guest operating system in which at least one application runs. It should be noted that these embodiments may also apply to other examples of contexts, such as containers not including a guest operating system, referred to herein as "OS-less containers" (see, e.g., www.docker.com). OS-less containers implement operating system-level virtualization, wherein an abstraction layer is provided on top of the kernel of an operating system on a host computer. The abstraction layer supports multiple OS-less containers each including an application and its dependencies. Each OS-less container runs as an isolated process in userspace on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O. The term "virtualized computing instance" as used herein is meant to encompass both VMs and OS-less containers.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

What is claimed is:

1. A method of configuring an application to manage persistent memory (PM) in a computer system, comprising:
    modifying, by a compiler during compilation of the application, source code of the application to add instructions to update tracking metadata for store instructions in the source code that target memory blocks mapped to the PM;
    compiling, by the compiler, the source code to generate an executable process;
    issuing, by a synchronization routine executing on the computer, write-back instructions during execution of the executable process based on the tracking metadata; and wherein the step of modifying comprises:
analyzing the source code to identify volatile memory blocks and persistent memory blocks;
analyzing the source code to identify persistent store instructions that update the persistent memory blocks and volatile store instructions that update the volatile memory blocks; and
adding one or more instructions after each persistent store instruction to update the tracking metadata with an address of a persistent memory block targeted by the persistent store instruction.

2. The method of claim 1, wherein the step of modifying comprises:
analyzing the source code to identify unknown store instructions; and
adding instructions after each unknown store instruction to perform a runtime bounds check to update the tracking metadata in case the unknown store instruction targets a persistent memory block.

3. The method of claim 1, wherein the tracking metadata comprises a bit array.

4. The method of claim 1, wherein the tracking metadata comprises a circular buffer.

5. The method of claim 1, wherein the step of issuing comprises:
enumerating the tracking metadata to determine dirty memory blocks to be flushed;
issuing a write-back instruction for each of the dirty memory blocks; and
resetting the tracking metadata to start a new epoch.

6. The method of claim 5, wherein the step of issuing comprises:
removing spurious entries in the tracking metadata.

7. A non-transitory computer readable medium comprising instructions, which when executed in a computer system, causes the computer system to carry out a method of configuring an application to manage persistent memory (PM) in a computer system, comprising:
modifying, by a compiler during compilation of the application, source code of the application to add instructions to update tracking metadata for store instructions in the source code that target memory blocks mapped to the PM;
compiling, by the compiler, the source code to generate an executable process; and issuing, by a synchronization routine executing on the computer, write-back instructions during execution of the executable process based on the tracking metadata; and
wherein the step of modifying comprises:
analyzing the source code to identify volatile memory blocks and persistent memory blocks;
analyzing the source code to identify persistent store instructions that update the persistent memory blocks and volatile store instructions that update the volatile memory blocks; and
adding one or more instructions after each persistent store instruction to update the tracking metadata with an address of a persistent memory block targeted by the persistent store instruction.

8. The non-transitory computer readable medium of claim 7, wherein the step of modifying comprises:
analyzing the source code to identify unknown store instructions; and
adding instructions after each unknown store instruction to perform a runtime bounds check to update the tracking metadata in case the unknown store instruction targets a persistent memory block.

9. The non-transitory computer readable medium of claim 7, wherein the tracking metadata comprises a bit array.

10. The non-transitory computer readable medium of claim 7, wherein the tracking metadata comprises a circular buffer.

11. The non-transitory computer readable medium of claim 7, wherein the step of issuing comprises:
enumerating the tracking metadata to determine dirty memory blocks to be flushed;
issuing a write-back instruction for each of the dirty memory blocks; and
resetting the tracking metadata to start a new epoch.

12. The non-transitory computer readable medium of claim 11, wherein the step of issuing comprises:
removing spurious entries in the tracking metadata.

13. A computing system, comprising:
a memory configured to store a compiler and an application to manage persistent memory (PM);
and a processor, coupled to the memory, configured to execute the compiler to perform:
modifying, during compilation of the application, source code of the application to add instructions to update tracking metadata for store instructions in the source code that target memory blocks mapped to the PM;
compiling the source code to generate an executable process; and issuing, by a synchronization routine, write-back instructions during execution of the executable process based on the tracking metadata; and
wherein the modifying comprises:
analyzing the source code to identify volatile memory blocks and persistent memory blocks;
analyzing the source code to identify persistent store instructions that update the persistent memory blocks and volatile store instructions that update the volatile memory blocks; and
adding one or more instructions after each persistent store instruction to update the tracking metadata with an address of a persistent memory block targeted by the persistent store instruction.

14. The computer of claim 13, wherein the modifying comprises:
analyzing the source code to identify unknown store instructions; and
adding instructions after each unknown store instruction to perform a runtime bounds check to update the tracking metadata in case the unknown store instruction targets a persistent memory block.

15. The computer of claim 13, wherein the tracking metadata comprises a bit array.

16. The computer of claim 13, wherein the tracking metadata comprises a circular buffer.

17. The computer of claim 13, wherein the issuing comprises:
enumerating the tracking metadata to determine dirty memory blocks to be flushed;
issuing a write-back instruction for each of the dirty memory blocks; and
resetting the tracking metadata to start a new epoch.

* * * * *